(12) United States Patent
Fordyce, III (10) Patent No.: US 8,660,893 B2
(45) Date of Patent: Feb. 25, 2014

(54) MULTI-VENDOR MULTI-LOYALTY CURRENCY PROGRAM

(75) Inventor: Edward W. Fordyce, III, Sedalia, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 829 days.

(21) Appl. No.: 12/177,530

(22) Filed: Jul. 22, 2008

(65) Prior Publication Data

US 2009/0030793 A1    Jan. 29, 2009

Related U.S. Application Data

(60) Provisional application No. 60/951,457, filed on Jul. 23, 2007.

(51) Int. Cl.
*G06Q 30/00* (2012.01)

(52) U.S. Cl.
USPC ............................................ 705/14.3

(58) Field of Classification Search
None
See application file for complete search history.

(56) References Cited

U.S. PATENT DOCUMENTS

| | | | |
|---|---|---|---|
| 2001/0054006 A1 | 12/2001 | Lee et al. | |
| 2002/0082920 A1* | 6/2002 | Austin et al. | 705/14 |
| 2002/0143614 A1 | 10/2002 | MacLean et al. | |
| 2003/0236712 A1* | 12/2003 | Antonucci et al. | 705/26 |
| 2006/0253320 A1 | 11/2006 | Heywood | |
| 2007/0124204 A1* | 5/2007 | de Boer et al. | 705/14 |
| 2007/0156530 A1* | 7/2007 | Schmitt et al. | 705/14 |

FOREIGN PATENT DOCUMENTS

| | | |
|---|---|---|
| KR | 20030075916 | 9/2003 |
| KR | 20070075986 | 7/2007 |
| KR | 20060060283 | 8/2007 |
| WO | WO 01/11512 A1 | 2/2001 |
| WO | 2008028154 | 3/2008 |
| WO | 2008052073 | 5/2008 |
| WO | 2011044137 | 4/2011 |

OTHER PUBLICATIONS

European Patent Application No. 08782274.8, Extended Search Report, Apr. 20, 2011.
International Patent Application PCT/US08/70913, International Search Report and Written Opinion, Jan. 29, 2009.
International Patent Application PCT/US2010/051490, International Seach Report and Written Opinion, Apr. 21, 2011.

* cited by examiner

*Primary Examiner* — Matthew T Sittner
(74) *Attorney, Agent, or Firm* — Greenberg Traurig LLP (57) ABSTRACT

Loyalty programs can be operated within a payment processing system having multiple vendors, thereby providing access to detailed transaction data and with the flexibility for customization of the loyalty programs themselves, by establishing a communication for the transfer of data via a customer-facing channel. When the payment processing system processes a transaction between a merchant and an account holder, in addition to obtaining payment for the merchant from the account via an acquirer and an issuer, respectively, a transaction handler tabulates and stores, different types of loyalty currencies in a loyalty reward account associated with the account holder if the account holder is enrolled in a loyalty program and criteria for applying the loyalty program are satisfied. The account holder is provided access to the loyalty account via the customer-facing channel.

18 Claims, 3 Drawing Sheets

MULTI-VENDOR MULTI-LOYALTY CURRENCY PROGRAM

RELATED APPLICATIONS

This application claims priority to U.S. Provisional Patent Application No. 60/951,457, filed Jul. 23, 2007, titled Multi-Vendor Loyalty Program.

FIELD

Various implementations, and combinations thereof, are related to payment processing programs, more particularly to loyalty programs, and most particularly to a loyalty program within a payment processing system having multiple vendors.

BACKGROUND

Loyalty programs provide consumers with incentives to shop at certain loyalty program participating facilities, or to show loyalty to a particular merchant, or to a service provider such as a financial institution (e.g., Chase Manhattan Bank). In addition to receiving discounts or financial awards, an incentive to the consumer may include redeemable goods or services, or special recognition of some sort, such as an upgrade to goods or services purchased by the consumer. Often, financial institutions, such as an issuing bank or acquiring bank, provide financial and logistic support to the loyalty program. Loyalty programs may be associated with various transaction payment process programs such as a credit card program, a charge card program, a debit card program, a prepaid card program, or a gift card program.

One indicator of success for any loyalty program is how well it can target consumers that will be positively influenced to participate in the program in exchange for receiving the incentives described by and provided through the loyalty program.

These loyalty programs are typically constructed, marketed, qualified, fulfilled, or refined with limited interaction or collaboration between the various participants of the programs, where the participants may include merchants, financial institutions such as acquirers and issuers, transaction handlers such as credit card companies (i.e., Visa, MasterCard, American Express, etc.), and consumers such as an account holder. For example, a merchant may wish to participate in a co-branded credit card loyalty program (i.e., a Southwest Airlines Chase Manhattan Bank Visa Credit Card). The merchant finds, however, that it will be confined to loyalty program features set solely by the issuing bank (i.e., Chase Manhattan Bank), the features include an overly restrictive credit limit, a conservative bonus mile to purchase ratio, or a limited redemption points option. As such, the merchant will be precluded from finely targeting the merchant's most desired consumers would not be positively influenced to participate in the program in exchange for receiving such limited incentives. The level of loyalty program feature confinement is especially prominent among merchants with a smaller portion of the market who lack influence over the loyalty program and its participants.

A further draw back is that loyalty programs may have limited access to detailed transaction data. For example, some loyalty program participants, such as financial institutions, may rely on their own transaction data records and history to determine the type of incentive to provide to a consumer for conducing one or more transactions. This data history, however, may be limited in scope depending on the degree of transaction specificity that the issuer collects or is able to maintain. Similarly, merchants wishing to set up a loyalty program may solicit financial institutions for transaction data history information, without success in gaining access to the full scope of the transaction data. Even if a merchant gains access to the transaction data, the transaction data may not be in a form the merchant can effectively utilize.

The lack of uniformity in handing transaction data may hamper accurate communication between participants in a loyalty program. For example, acquirers may identify a single merchant differently; one acquirer may identify a merchant by its name and address while another acquirer may identify the same merchant by its name and franchise store number. Similarly, each participant in the loyalty program may be accustomed to processing transaction data in a particular format that may not be the same as the format of another participant of the loyalty program. For example, a merchant that is an airline company may analyze transaction data in units of "frequent flyer program bonus miles per dollar" while an issuer may record dollars spent per month.

Thus, there is a need for a loyalty program having access to detailed transaction data while maintaining a uniform communication protocol between the participants of the program. Further, there is a need for a loyalty program capable of accommodating customizations from its various participants.

SUMMARY

In one implementation, for each transaction processed by a transaction handler, a comparison is made of at least one of an account, an issuer of the account, a merchant, and at least one of the items in the transaction to loyalty data in a loyalty database to find at least one predetermined match. Each predetermined match has an associated loyalty reward that is a function of the transaction and is denominated in a loyalty currency. For each predetermined match, the loyalty currency of the associated loyalty reward is added to a balance of the same loyalty currency in a loyalty account associated with the account of the account holder. The loyalty account associated with the account of the account holder can have a balance for each of a plurality of different loyalty currencies. The associated loyalty reward can be calculated as a function of the transaction at least in part from the number of a financial currency for the payment for the transaction, the number of the items in the transaction, the number of the items in the transaction, and/or the number of a particular said item in the transaction.

In another implementation, a loyalty program is operated within a payment processing system by establishing a communication protocol for the transfer of data via a customer-facing channel. When the payment processing system processes a transaction engaged in between a merchant and an account holder, in addition to obtaining payment for the merchant from the account associated with the consumer transaction device involved, a loyalty currency is stored in a loyalty account associated with the account holder if the account holder is enrolled in a loyalty program and if criteria for applying the loyalty program are satisfied. The account holder is provided access to the loyalty account via the customer-facing channel.

In yet another implementation, a loyalty program is operated within a payment processing system by establishing a communication protocol for the transfer of data via a customer-facing channel and by storing criteria associated with each loyalty program operated within the payment processing system in a loyalty program database. Further, a loyalty account is configured in an account holder database for each account holder enrolled in a loyalty program operated within the payment processing system. When the payment processing system processes a transaction engaged in between a merchant and an account holder, in addition to obtaining payment for the merchant from the account associated with the consumer transaction device involved, a loyalty currency is stored in the loyalty account associated with the account holder engaged in the transaction. This currency is stored if the account holder is associated with one of the loyalty accounts that is configured in the account holder database and if the plurality of criteria associated with one of the loyalty programs in which the account holder is enrolled is satisfied. The account holder is provided access the loyalty account via the customer-facing channel.

In still another implementation, a payment processing system is provided in which a merchant engages in a transaction with an account holder upon an account associated with a portable consumer device issued by an issuer. A transaction handler further coordinates the transfer of monetary currency to an acquirer of the merchant and the transfer of loyalty currency to a loyalty account of the account holder in response to the transaction satisfying the application criteria of a loyalty program and in response to the account holder being enrolled in that loyalty program. The account holder accesses the loyalty account using a customer-facing channel that is in communication with the transaction handler and is provided by a sponsor of the loyalty program.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Figure 1:
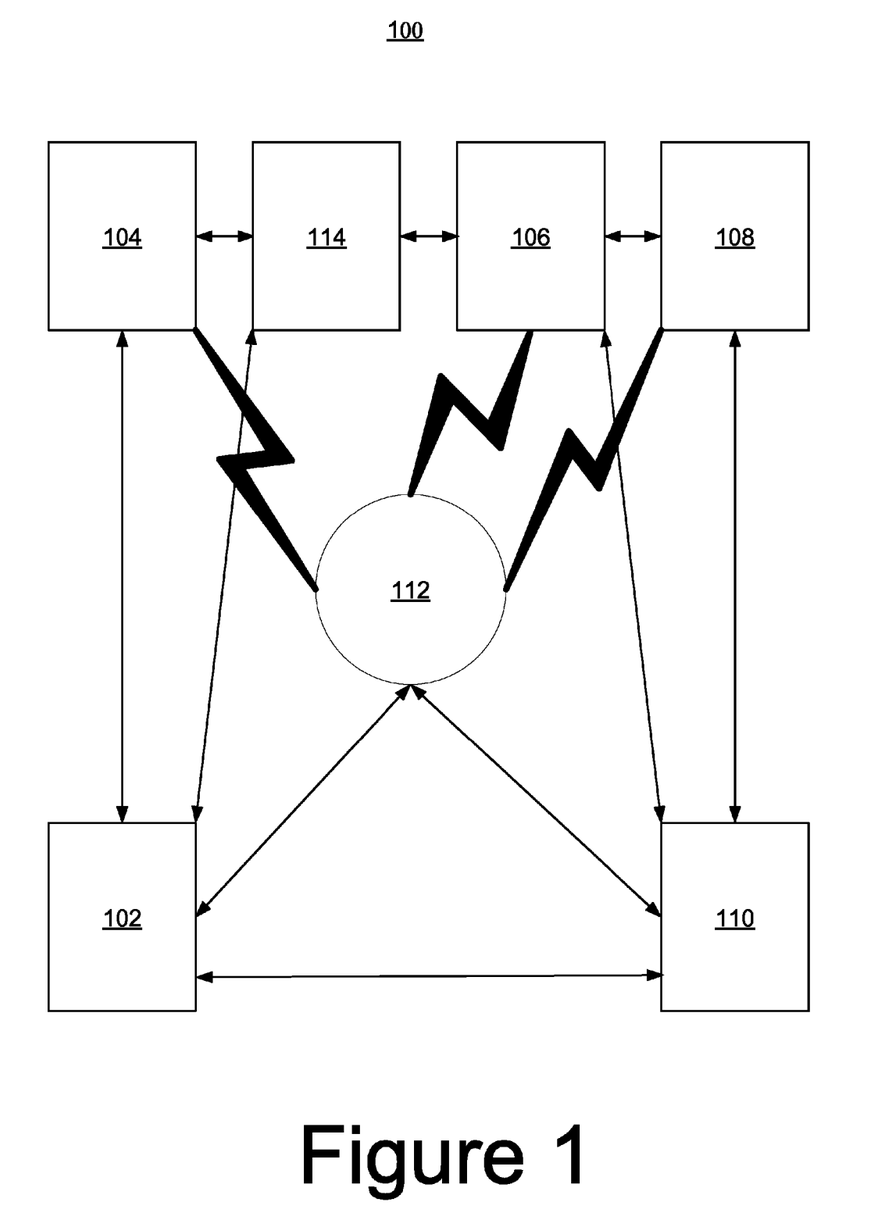
FIG. 1 is a block level diagram illustrating an exemplary payment processing system.

Implementations propose a structure for developing and executing a loyalty program. As background information for the foregoing and following description, as will be readily understood by persons of ordinary skill in payment processing systems, a transaction such as a payment transaction in a payment processing system can include participation from different entities that are each a component of the payment processing system. An exemplary payment processing system is depicted in FIG. 1 as the payment processing system 100. The payment processing system 100 includes the issuer 104, the transaction handler 106, such as a credit card company, the acquirer 108, the merchant 110, or the consumer 102. The acquirer 108 and the issuer 104 can communicate through the transaction handler 106. Merchant 110 may utilize at least one Point of Service "POS" terminal that can communicate with the acquirer 108, the transaction handler 106, or the issuer 104. Thus, the POS terminal is in operative communication with the payment processing system 100.

Typically, a transaction begins with the consumer 102 presenting a portable consumer device 112 to the merchant 110 to initiate an exchange for a good or service. The portable consumer device 112 may include a payment card, a gift card, a smartcard, a smart media, a payroll card, a health care card, a wrist band, a tag, a badge, a machine readable medium containing account information, a keychain device such as the SPEEDPASS® commercially available from Exxon-Mobil Corporation, a supermarket discount card, a cellular telephone, a personal digital assistant, a pager, a security card, an access card, a wireless terminal, or a transponder. The portable consumer device 112 may include volatile and/or non-volatile memory to store information such as the account number or an account holder's name.

The merchant 110 may use the POS terminal to obtain account information, such as an account number, from the portable consumer device 112. The portable consumer device 112 may interface with the POS terminal using a mechanism including any suitable electrical, magnetic, or optical interfacing system such as a contactless system that uses a radio frequency or a magnetic field recognition system, or a contact system that uses a magnetic stripe reader. The POS terminal sends a transaction authorization request to the issuer 104 of the portable consumer device 112. Alternatively, or in combination, the portable consumer device 112 may communicate with the issuer 104, the transaction handler 106, or the acquirer 108.

The issuer 104 may authorize the transaction using the transaction handler 106. The transaction handler 106 may also clear the transaction. Authorization includes the issuer 104, or the transaction handler 106 on behalf of the issuer 104, authorizing the transaction in connection with the issuer 104's instructions such as through the use of business rules. The business rules could include instructions or guidelines from the transaction handler 106, the consumer 102, the merchant 110, the acquirer 108, the issuer 104, a financial institution, or combinations thereof. The transaction handler 106 may maintain a log or history of authorized transactions. Once approved, merchant 110 will record the authorization, allowing the consumer 102 to receive the good or service.

Merchant 110 may, at discrete periods, such as the end of the day, submit a list of authorized transactions to the acquirer 108 or other components of the payment processing system 100. The transaction handler 106 may compare the submitted authorized transaction list with its own log of authorized transactions. If a match is found, the transaction handler 106 may route authorization transaction amount requests from the corresponding acquirer 108 to the corresponding issuer 104 involved in each transaction. Once the acquirer 108 receives the payment of the authorized transaction amount from the issuer 104, it can forward the payment to merchant 110 less any transaction costs, such as fees. If the transaction involves a debit or pre-paid card, the acquirer 108 may choose not to wait for the initial payment prior to paying the merchant 110.

There may be intermittent steps in the foregoing process, some of which may occur simultaneously. For example, the acquirer 108 can initiate the clearing and settling process, which can result in payment to the acquirer 108 for the amount of the transaction. The acquirer 108 may request from the transaction handler 106 that the transaction be cleared and settled. Clearing includes the exchange of financial information between the issuer 104 and the acquirer 108 and settlement includes the exchange of funds. The transaction handler 106 can provide services in connection with settlement of the transaction. The settlement of a transaction includes depositing an amount of the transaction settlement from a settlement house, such as a settlement bank, which the transaction handler 106 typically chooses, into a clearinghouse, such as a clearing bank, that the acquirer 108 typically chooses. The issuer 104 deposits the same from a clearinghouse, such as a clearing bank, which the issuer 104 typically chooses into the settlement house. Thus, a typical transaction involves various entities to request, authorize, and fulfill processing the transaction.

Payment processing system 100 may also process loyalty programs. For example, when the consumer 102 makes a purchase using the portable consumer device 112 at a store of the merchant 110, the consumer 102 may be eligible to receive an incentive, such as a frequent flyer point, that can be applied toward a reward, such as a free airline ticket. In one implementation, when consumer 102 makes such a purchase, the consumer's 102 eligibility is determined by an implementer. By way of example, and not by way of limitation, an implementer may be the transaction handler 106. In such an implementation, the transaction handler 106, upon receiving the transaction data, may compare the data to a database of loyalty programs to determine if the transaction meets the eligibility requirements of any loyalty program, the rules and parameters of each loyalty program having been established by its sponsor. In some implementations, the sponsor may be the issuer. In yet other implementations, the sponsor may be, for example, a transaction handler, such as a credit card company, an acquirer, a merchant, a third-party, or a combination thereof.

If the transaction meets the eligibility requirements of a given loyalty program, the transaction handler may then calculate a loyalty currency to be applied to a reward account of the consumer using rules and parameters of the program. The loyalty currency may, in some implementations, be frequent flyer points that can be applied toward a free airline ticket. In other implementations, the loyalty currency may be cash back, future discounts, coupons, donations to selected charities, special rates, or any other form of loyalty program reward, or combination thereof.

For example, the consumer 102 may be a participant of a Saks Fifth Avenue® loyalty program having a purchase-to-point ratio of $100 (U.S.)/1 point. Upon receiving a request to process a transaction for $1000 (U.S.) between the consumer 102 and a merchant 110, in this case being a Saks Fifth Avenue® store, the transaction handler 106 would compare the transaction data to the eligibility requirements of all known loyalty programs. Once it is determined the transaction meets the eligibility requirements of a loyalty program, here that of the Saks Fifth Avenue® loyalty program, the transaction handler 106 calculates the loyalty currency based on the rules and parameters of the loyalty program, in this illustration equaling 10 points. Once the points are determined, the value of the currency (here being measured by 'points') can be tracked and accumulated in an reward account at a point bank, that may, for example, also be a function performed by the transaction handler 106.

In one implementation, the point bank may have standardized input and output format structures that are communicated to sponsors of loyalty programs such that communication with the point bank is facilitated and controlled. The standardized input and output format structures allow for a plurality of vendors that may be third-parties to interact in a compatible fashion with the point bank and provide services to the sponsors and consumers of the loyalty program. Thus, for example, although the same entity is acting as the point bank for each loyalty program, the appearance and functionality of each loyalty program can be tailored to the sponsor's or consumer's needs. Sponsors that have multiple or complex loyalty programs can collaborate with third-party vendors to assist in each program's development and execution. Vendors may, for example, provide services such as hosting websites, managing rewards catalogs, facilitating fulfillment of loyalty program incentives, and providing customer support.

Where a third-party vendor 114 is used to establish customer-facing channels, consumer 102 may use the third-party vendor 114's services when redeeming, verifying, updating information, or otherwise accessing their reward account. Through the use of standardized input and output format structures, communication with the implementer (i.e., the transaction handler 106) is transparent to the consumer 102, and the consumer 102 will perceive an experience of interacting solely with the loyalty program sponsor. Thus, through collaboration with the third-party vendor 114, the loyalty program sponsor can, for example, create a custom interface through a website that they have already established and branded themselves rather then having the consumer 102 utilize an unfamiliar interface provided by the point bank.

In another implementation, problems can be addressed or solved by an implementer who is providing a loyalty program and also keeping track of loyalty program currency in a loyalty program currency bank (i.e., a point bank), where the implementer is also processing transactions that are eligible for point credit in the loyalty program. In this implementation, an efficiency is gained by allowing this implementer to calculate the loyalty points for account holders (e.g., cardholders) as opposed to transmitting that information to a third-party for processing and points calculation. Rather, this implementer can perform this function on behalf of all of the issuers in the payment system that are participating in the loyalty program. Moreover, this implementation allows for multiple vendors to share a common set of standards. This sharing makes these vendors interoperable in the loyalty program so as to allow participating member banks (e.g., issuers) to contract with these vendors for the provision of programs (e.g., customer-facing program functions), such as providing websites, providing reward catalogs, customer service, and marketing activities. By implementing such a multiple and interoperable vendor model for a loyalty program, the implementer is able to provide a baseline loyalty program processing service in a cost effective manner, while allowing the member banks (e.g., issuers) and other participants in the loyalty program sufficient flexibility to create different consumer (i.e., account holder or cardholder) experiences. As such, the implementer may also be operating the "core" component of the payment processing system (i.e., such as the exemplary system shown in FIG. 1), while member banks (e.g., issuers) contract with the multiple and interoperable vendors to help the banks to differentiate themselves on customer service and reward options.

Figure 2:
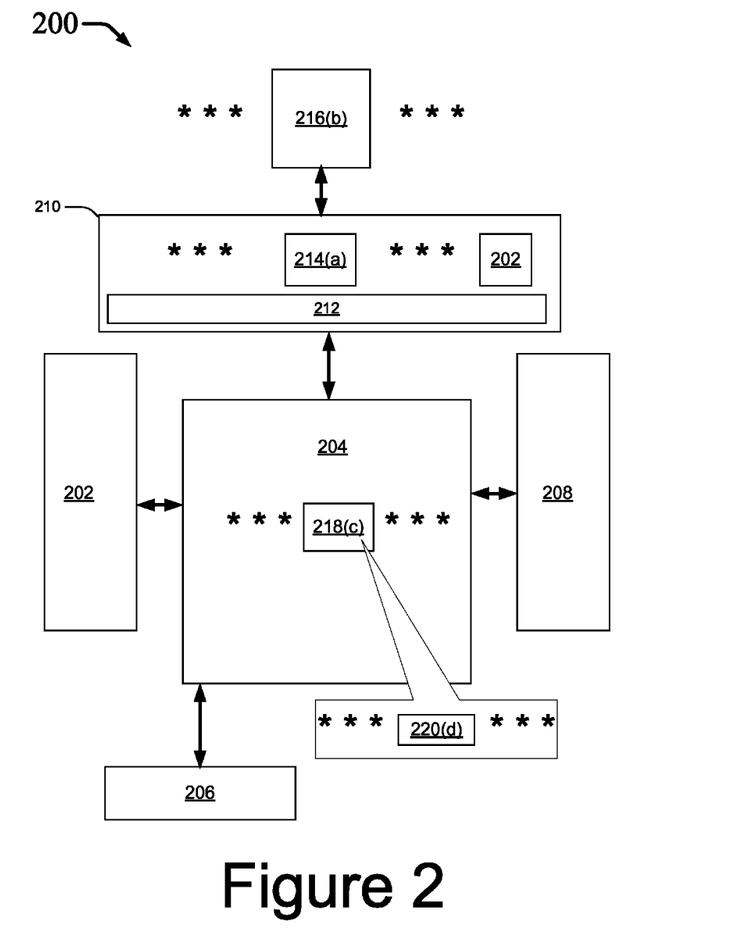
FIG. 2 is a block level diagram illustrating an exemplary multi-vendor loyalty program operated within the system illustrated in FIG. 1.

Referring to FIG. 2, a block diagram illustrates an exemplary implementation of a loyalty program structure 200 that is compatible with a plurality consumer interfaces provided by different vendors and/or agents thereof. A bulk file management system 202 may be used to facilitate communication of information in data files from external entities with an operational data store 204 within a point bank. The operational data store 204 may be a database such as a relational database and may store all information pertaining to each consumer's reward account. The data files may include: (i) real time settlement files ("RSI") obtained after the purchase of a good or service from the merchant has been cleared and settled; (ii) participation agreement files ("PA") from the issuer that delineate how the issuer has agreed to participate in the loyalty program; (iii) earn engine files that may include loyalty program business rules; and (iii) other loyalty program files that delineate the parameters of the loyalty program such as: (a) files containing consumer profiles including an account number within the payment processing system; (b) a category of the of the account such as a "gold account; (c) the number of people on the account; and the like. The data files may further include information for the point bank such as transaction loads, bonus loads, bonus adjustments, aggregation files related to the account associated with the payment processing system, and fulfillment transaction histories (e.g., the history of transactions involving the account associated with the payment processing system).

Once an activity triggers an incentive, such as a purchase at the store of the merchant, information from the operational data store 204 may pass to the loyalty program incentive calculator 206. The loyalty program incentive calculator 206 may be an engine that utilizes software to run calculations given loyalty program business rules, such as loyalty reward and currency algorithms, to determine whether the transaction qualifies for an incentive of the loyalty program, and to compute the amount and form of any of several different loyalty currencies that have been earned. This information can be communicated to the operational data store 204. There, the particular type of loyalty currency that has been earned by the consumer is added to a balance of that loyal currency maintained at reference numeral 220(d) within the consumer's reward account 218(c) of operational data store 204. Within operational data store 204, which is preferably maintained by the transaction handler or agent thereof, there are reward accounts 218(1) through 218(C), and wherein within each reward account 218(c) there are currency balances 220(1) through 220(D).

In some implementations, the loyalty program incentive calculator 206 may further include issuer and merchant transaction histories such as transaction histories involving points, bonuses, and incentives. The loyalty program incentive calculator 206 may also access issuer or consumer profiles to implement the loyalty program business rules for the loyalty program in which both the issuer and the consumer are participants.

Regular maintenance activities on the reward accounts and the coordination of outgoing reports and summaries may be conducted through a batch activities system 208 in communication with the operational data store 204. By way of example, and not by way of limitation, such activities may include sweeping the reward account daily, monitoring the inactivity of a reward account, monitoring of point expiration or validity, creating reports, file management activities such as file extracts and file updates, calculation of fees, and generation of bills. Consequently, daily, weekly, and monthly events such as reward account monitoring and maintenance can be done in communication with the operational data store 204.

Interface layer 210 provides a means for a participant 216(b) to interact with the operational data store 204, where the participants 216 in FIG. 2 include participant 216(1) through participant 216(B). In one implementation, participants 216 may be sponsors of the loyalty programs using an interface 214(a) established by the point bank, the interfaces 214 in FIG. 2 include interface 214(1) through interface 214(A). In another implementation, the participants 216 may be consumers, where each interface 214(a) is a customer-facing program provided by a sponsor or its agent of a different loyalty program or by a third-party vendor or agent thereof. Each interface 214(a) communicates with the operational data store 204 using a standard input and output protocol defined by the point bank.

Where a participant is a sponsor of a loyalty program, interface 214(a) may be used to create and manage an issuer sponsor. For example, the sponsor may set up preferences for its loyalty program business rules, such as delineating a loyalty currency that it can offer to a consumer who is utilizing a portable consumer device in one or more transactions, and where the device is associated with that sponsor.

The consumer who participates in the sponsor's loyalty program may manage a reward account stored at the point bank via an interface 214(a), the interface 214(a) being a customer-facing program. Where the interface 214(a) has been provided by the sponsor or by third-party vendor at the direction of the sponsor, the sponsor can choose to allow the consumer to, for example, check the consumer's reward account balance, opt-in or opt-out of certain features of a loyalty program, or redeem incentives. Alternatively or in combination, the interface 214(a) may offer consumer support and access to administrative services. Additionally, the interface layer 210 may include a security service layer such that data may be encrypted as it is passed from the operational data store 204 to the interface 214 accessed by the participant 216.

In collaboration with the sponsors, third-party vendors may further provide services including hosting the consumer (account holder) web site, cataloging the services that the issuer or the acquirer can provide to the consumer or the merchant respectively, fulfillment of loyalty program incentives, providing voice response unit ("VRU") and consumer services.

One entity may provide several components of the loyalty program structure 200 while other entities, such as third-parties, may provide other components. In one implementation, a transaction handler may: (i) access the transaction handler's data files stored in the bulk file management system 202; (ii) communicate with the operational data store 204; (iii) determine the eligibility of a purchase toward an incentive; (iv) determine the value of the incentive via the loyalty program incentive calculator 206; (v) conduct activities using the batch activities system 208 on the reward account stored in the operational data store 204; and (vi) communicate with aspects of the interface layer 210 while interacting with a plurality of vendors that provide the interfaces 214(1)-214(A).

As previously mentioned, compatibility between the plurality of vendors providing interfaces 214 and the transaction handler providing the other components in the loyalty program structure 200 may be achieved via standardized communication formats. For example, one interface 214(a) may be an interactive account holder website that accepts consumer input such as account holder name. The account holder name may be in the format of first name, middle initial, and last name. Alternatively, or in combination, the account holder may enter an account number that is associated with the payment processing system. The account number may be in the format such that the last four digits must be entered along with an expiration date for the portable consumer device associated with the account. In another example, the sponsor may create a profile using an interface 214(a) such that a Globally Unique IDentifier (GUID) is utilized to identify the issuer. Here, the GUID will be unique within the payment processing system. The GUID for the sponsor may be in a standard format that the transaction handler utilizes to process the transactions of the issuer within the loyalty program structure 200.

To illustrate, a first issuer, may customize the services that the first issuer can provide to the consumer despite the fact that the first issuer is utilizing the same transaction handler to process transactions through the payment processing system as a second issuer. The first issuer may contract with third-party vendors to provide a unique website describing the loyalty program in which the first issuer is a participant. For example, the first issuer may have its own logo on the website describing the loyalty program that the first issuer is a participant and/or the first issuer may advertise a point-to-purchase ratio that the issuer can provide to the consumer which may be different from a point-to-purchase ratio that the second issuer may be able to provide to the consumer. In this manner, the first issuer may distinguish itself from the second issuer within the payment processing system.

Figure 3:
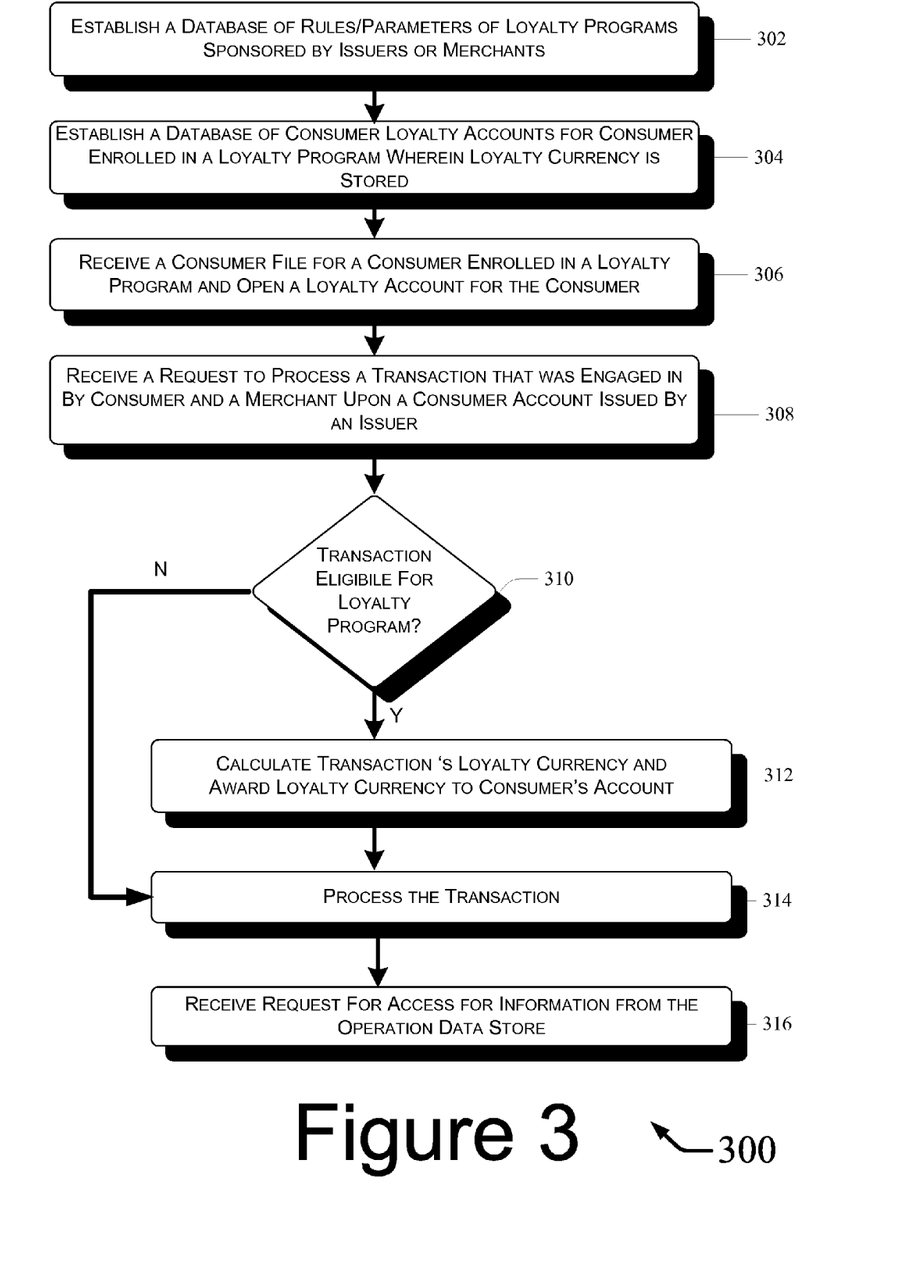
FIG. 3 is a schematic flowchart illustrating an exemplary implementation of a loyalty program according to the implementation depicted in FIG. 2.

Referring to FIG. 3, a schematic flowchart illustrates an exemplary implementation of a loyalty program according to the implementation depicted in FIG. 2. In this illustration the point bank is discussed in terms of the transaction handler. However, those of ordinary skill in the art will realize that the point bank may be another entity either internal to or external of a payment processing system without changing the fundamentals of the discussion.

Initially, a transaction handler establishes a database or other record of the rules and parameters of each loyalty program sponsored by a sponsor (302). In one implementation, to establish a loyalty program, the sponsor may utilize an interface provided by the transaction handler that is capable of communicating with an operational data store. In another implementation, a sponsor may use another means to communicate with the transaction handler, such as through a representative.

In conjunction with establishing a loyalty database, the transaction handler also establishes a database of consumer reward accounts wherein a plurality of different loyalty currencies will be banked for each consumer enrolled in a loyalty program maintained in the loyalty database (304). When the transaction handler receives a consumer file of a consumer that has enrolled in a loyalty program, the transaction handler opens a loyalty account for the consumer (306).

Upon the receipt of a request to process a transaction that was engaged in by a merchant and a consumer upon a consumer account issued by an issuer (308), the transaction handler compares the transaction data with the eligibility requirements of the loyalty programs stored in the loyalty database (310). If the transaction meets the eligibility requirements of a loyalty program, the transaction handler utilizes the rules and parameters of the program to calculate and award one or more different types of loyalty currencies to the consumer's reward account (312). Finally, the transaction handler processes the transaction as described in connection with FIG. 1 (314).

Once a loyalty program or a reward account has been established, the transaction handler may further receive a request to access information from the operation data store via an interface using a standard input-output protocol established by the transaction handler (316). Where the request is received from an issuer, or other sponsor of a loyalty program, the request is for information pertaining to the issuer's loyalty program. The issuer may further use the user interface to modify the rules and parameters of a loyalty program. Alternatively, where a request is received from a consumer, information pertaining to the consumer's reward account is accessed. Using the interface, the consumer may then, for example, choose to opt in or out of features, redeem loyalty currency, or update personal information.

The interface used may be provided and hosted by the transaction handler. In other implementations, the interface is provided by the loyalty program's sponsor. In yet other implementations, the sponsor uses a third-party vendor to provide the interface. In each case, the interface communicates with the operational data store using standard communication protocol, thereby making the communication with the transaction handler transparent to the participant.

The loyalty program structure described can be utilized within an exemplary automated loyalty program platform associated with the payment processing system. The loyalty program participants can utilize portions of the vendor services, such as web site interfaces that may be linked to the automated loyalty program platform, to develop or implement the parameters of the loyalty program.

In one implementation the automated loyalty program platform is a platform that the merchant or the issuer may access to set up loyalty program rules and/or parameters that the merchant wants to market to consumers. Once the loyalty program rules and/or parameters are set up, the automated loyalty program platform automatically generates promotions based on the rules and/or parameters and automatically implements the loyalty program rules and/or parameters as payment transactions are conducted through the payment processing system.

The automated loyalty program platform may be accessible to the merchant through the use of a device having a hardware component such as a CPU and/or a terminal and a software component such as code, microcode, applets, or modules that assist the merchant in conducting its business. The device, such as a POS terminal or a computer, may access the automated loyalty program platform through a network. The network may be the Internet.

The merchant may use the device to access the automated loyalty program platform to set up at least one parameter and/or loyalty program rule for a loyalty program promotion that the merchant wishes to market to past or potential consumers. For example, the merchant may set up a profile linked to a unique identifier for the merchant. The profile may include loyalty program rules that govern the creation and implementation of promotions that the merchant wants to market to consumers. The loyalty program rules may take on the form of "if parameter one occurs then offer parameter two." For example, the promotion may be a coupon promotion, such as a coupon indicating that if a purchase at the merchant's store made with an account associated to a payment processing system exceeds $100 in value, then 10% will be taken off the purchase value; the promotion may be a spend-and-get promotion such as if the consumer conducts four purchases made with the account at the merchant's store, the consumer's fifth purchase at the merchant's store will result in $10.00 being credited to the account associated with the payment processing system. The loyalty program rules and/or parameters may be predetermined such that the merchant picks them a la cart within a menu provided by the automated loyalty program platform, or they may be customized.

The automated loyalty program platform may also be in communication with the transaction handler and/or the issuer. Therefore, the automated loyalty program platform may access a transaction history database maintained by the transaction handler. Alternatively, the automated loyalty program platform may be part of the transaction handler. The automated loyalty program platform may communicate the merchant's loyalty program rules and/or parameters along with portions of the transaction information it received from the merchant's POS device in order to receive validation that the issuer supports the application of the transaction toward the loyalty program. For example, the consumer may have a promotion for $20 credit to be applied to the consumer's account within the payment processing system when making a $100 purchase at the merchant's store. When the automated loyalty program platform receives a transaction message indicating that the consumer has made a purchase of $100 at the merchant's store, it may send this information to the consumer's issuer to verify that the issuer agrees that the $100 purchase qualifies for the $20 promotion and for the issuer to indicate that the $20.00 credit will be applied and reflected in the consumer's statement of account.

For example, the merchant may be an office equipment store. The merchant may have overstocked paper within the month of March; consequently, the office equipment store may wish to provide a promotion to consumers living within 5 miles from its store. The office equipment store may use its POS device to access the automated loyalty program platform to set up a loyalty program rule offering a free pack of paper with the purchase of a printer toner. The automated loyalty program platform may then automatically create a coupon indicating that a free pack of paper is offered with the purchase of a printer toner. The coupon may have the office equipment store's logo or other customized promotional information. The automated loyalty program platform may then access a database containing the billing address of consumers that are account holders within the payment processing system. If the billing address of the consumer is within five miles of the location of the office equipment store, then the automated loyalty program platform addresses the generated coupon to the consumer with the billing address within five miles of the location of the office equipment store. Similarly, the office equipment merchant may wish to send out a promotion of 15% off to all account holders within the payment processing system that have purchased paper within a predetermined past time period. The automated loyalty program platform may access and gather select data (i.e., e-mail addresses) from a database containing past transaction history of account holders within the payment processing system. In gathering the select data, the platform may filter out those consumers that have purchased paper from any office equipment store within the predetermined past time period. The automated loyalty program platform may then automatically address the 15% off promotion to each e-mail address of each consumer that purchased paper from any office equipment store, such as from the competitors of the office equipment store that created the promotion. The consumer may then apply the coupon in an Internet purchase made via the office equipment store's webpage.

Various terms may be used herein, which are to be understood according to the following descriptions 1 through 8:

1. Acceptance point device includes a device capable of communicating with a payment device, where the acceptance point device can include a Point of Device (POS) device, a smartcard, a payment card such as a credit or debit card with a magnetic strip and without a microprocessor, a keychain device such as the SPEEDPASS™ commercially available from Exxon-Mobil Corporation, a cellular phone, personal digital assistant (PDA), a pager, a security card, an access card, a smart media, a transponder, personal computer (PC), tablet PC, handheld specialized reader, set-top box, electronic cash register (ECR), automated teller machine (ATM), virtual cash register (VCR), kiosk, security system, or access system;

2. Account holder or consumer includes any person or entity with an account and/or a payment device associated with an account, where the account is within a payment system;

3. Issuer includes any entity that issues one or more accounts and/or payment devices;

4. Merchant includes any entity that supports an acceptance point device;

5. Participant includes any consumer, person, entity, charitable organization, machine, hardware, software, merchant or business who accesses and uses the system of the invention, such as any consumer (such as primary member and supplementary member of an aggregate consumer account), retailer, manufacturer, and third-party provider, and any subset, group or combination thereof;

6. Redemption includes obtaining a reward using any portion of points, coupons, cash, foreign currency, gift, negotiable instruments, or securities;

7. Reward includes any discount, credit, good, service, package, event, experience (such as wine tasting, dining, travel), or any other item; and 8. Payment device includes a card, smartcard, ordinary credit or debit cards (with a magnetic strip and without a microprocessor), a keychain device (such as the SPEEDPASS™ device commercially available from Exxon-Mobil Corporation), cellular phone, personal digital assistant (PDA), pager, payment card, security card, access card, smart media, or transponder, where each payment device can include a loyalty module with a computer chip with dedicated hardware, software, embedded software, or any combination thereof that is used to perform actions associated with a loyalty program.

It should be understood that the present invention can be implemented in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods to implement the present invention.

The specification and figures are to be regarded in an illustrative manner, rather than a restrictive one, and all such modifications are intended to be included within the scope of present invention. The steps recited in any of the method or process claims may be executed in any order and are not limited to the order presented in the claims. The invention has been described with reference to specific examples and implementations for illustrative purposes only and it is understood that various modifications or changes in light thereof will be suggested to persons skilled in the art and are to be included within the spirit and purview of this application and scope of the appended claims.

What is claimed is:

1. A method, comprising:
for each transaction of a plurality of transactions processed by a transaction handler, comparing, via a computing device, at least one of an account of a consumer, an issuer of the account, a merchant, and an item in the transaction to loyalty data in a loyalty database to find a match, wherein the match has an associated loyalty reward that is a function of the transaction and is denominated in a loyalty currency;
accessing a consumer profile of a first consumer to implement loyalty program business rules provided by a first sponsor for a first loyalty program;
processing transaction data for a first transaction of the plurality of transactions using the loyalty program business rules to compute a first amount of a first loyalty currency and a second amount of a second loyalty currency, the first and second currencies being different types of loyalty currencies, wherein the first loyalty currency amount is a dollar credit and the second loyalty currency amount is a number of points, and wherein the processing the transaction data comprises using data for the first consumer from transaction histories of a plurality of consumers including the first consumer to compute the first and second loyalty currency amounts; and in response to the transaction data meeting the requirements of the first loyalty program, adding, via the computing device, the first amount to a first loyalty currency balance of a loyalty account of the first consumer and the second amount to a second loyalty currency balance of the loyalty account.

2. The method of claim 1, wherein the match is between the account and a member selected from the group consisting of:
the issuer, the merchant, and the item in the transaction;
the issuer;
the merchant;
the item in the transaction;
a plurality of different items in the transaction; and
combinations of the foregoing.

3. The method of claim 1, wherein the processing the transaction data further comprises computing the first and second amounts as a function of the first transaction using a number selected from the group consisting of:
a number of a financial currency for payment for the first transaction;
a number of items in the first transaction; and
a number of a particular item in the first transaction.

4. A method, comprising:
in response to satisfying criteria for a first loyalty program of a first sponsor, storing, via a computing device and for each transaction of a plurality of transactions for an account of a first consumer, a first loyalty currency and a second loyalty currency in a loyalty account associated with the account, wherein the first consumer is enrolled in the first loyalty program and the first and second loyalty currencies are of different types;
accessing a consumer profile of the first consumer to implement loyalty program business rules provided by the first sponsor for the first loyalty program;
calculating a first value for the first loyalty currency and a second value for the second loyalty currency using the criteria, wherein the first value is a dollar credit and the second value is a number of points, and wherein the calculating comprises using data for the first consumer from transaction histories of a plurality of consumers including the first consumer to compute the first and second values; and
adding the first value to a first loyalty currency balance of the loyalty account and the second value to a second loyalty currency balance of the loyalty account.

5. The method of claim 4, wherein the sponsor is an issuer of the account of the first consumer.

6. The method of claim 4, wherein the sponsor is a merchant with whom the first consumer has previously conducted one of the plurality of transactions.

7. A method, comprising:
receiving loyalty program business rules provided by a first sponsor for a first loyalty program of a plurality of loyalty programs, the first loyalty program associated with first criteria;
storing transaction histories of a plurality of consumers including a first consumer;
storing the first criteria in a loyalty program database, the database having a plurality of criteria each associated with one of the plurality of loyalty programs including the first loyalty program of the first sponsor;
configuring a first loyalty account in a consumer database, the database having a plurality of loyalty accounts each associated with a respective consumer enrolled in at least one of the plurality of loyalty programs, wherein the first consumer is enrolled in the first loyalty program; and
in response to satisfying the first criteria by a first transaction of the first consumer, storing a first loyalty currency in a first loyalty currency balance of the first loyalty account and storing a second loyalty currency in a second loyalty currency balance of the first loyalty account, the first and second loyalty currencies being of different types, wherein the first balance is a dollar credit and the second balance is a number of points, and wherein the storing comprises using data for the first consumer from the transaction histories to compute the first and second balances;
accessing a consumer profile of the first consumer to implement the loyalty program business rules.

8. The method of claim 7, further comprising facilitating redemption from the first or second loyalty currency balance via a customer-facing channel.

9. The method of claim 7, further comprising communicating with the first sponsor of the first loyalty program via a customer-facing channel.

10. The method of claim 9, wherein the first sponsor is an issuer.

11. The method of claim 9, wherein the first sponsor is a merchant.

12. The method of claim 9, wherein the communicating with the first sponsor of the first loyalty program via the customer-facing channel is through an agent of the first sponsor.

13. A method, comprising:
storing transaction histories of a plurality of consumers including a first consumer;
receiving a request to process a transaction between a first merchant and the first consumer, the request comprising transaction data;
comparing, via a computing device, the transaction data with respective requirements of a plurality of loyalty programs;
accessing a consumer profile of the first consumer to implement loyalty program business rules provided by a first sponsor for a first loyalty program of the plurality of loyalty programs;
processing the transaction data using the loyalty program business rules to compute a first loyalty currency amount and a second loyalty currency amount, the first and second loyalty currency amounts corresponding to different types of loyalty currencies, wherein the first loyalty currency amount is a dollar credit and the second loyalty currency amount is a number of points, and wherein the processing the transaction data further comprises using data for the first consumer from the transaction histories to compute the first and second loyalty currency amounts; and
in response to the transaction data meeting the requirements of the first loyalty program, awarding, via the computing device, the first loyalty currency amount to a first loyalty currency balance of an account of the first consumer and the second loyalty currency amount to a second loyalty currency balance of the account.

14. The method of claim 13, wherein the number of points is a number of frequent flyer points.

15. The method of claim 13, wherein the first sponsor of the first loyalty program is an issuer of the account.

16. The method of claim 13, further comprising facilitating redemption of at least a portion of the first or second loyalty currency balance via one of a plurality of interfaces.

17. A computer-readable medium storing instructions which, when executed on a computer system, cause the computer system to:
- receive a request to process a transaction between a first merchant and a first consumer, the request comprising transaction data;
- compare, via a computing device, the transaction data with respective requirements of a plurality of loyalty programs including a first loyalty program;
- access a consumer profile of a first consumer to implement loyalty program business rules;
- process the transaction data using the loyalty program business rules to compute a first loyalty currency amount and a second loyalty currency amount, the first and second loyalty currency amounts corresponding to different types of loyalty currencies, and further using data from transaction histories for the first consumer to compute the first and second loyalty currency amounts, wherein the first loyalty currency amount is a dollar credit and the second loyalty currency amount is a number of points; and
- in response to the transaction data meeting the respective requirements of the first loyalty program, award, via the computing device, the first loyalty currency amount to a first loyalty currency balance of an account of the first consumer and the second loyalty currency amount to a second loyalty currency balance of the account.

18. A system, comprising:
at least one processor; and
memory storing data regarding an account of a first consumer, and storing respective requirements of a plurality of loyalty programs including a first loyalty program, and further storing instructions configured to instruct the at least one processor to:
- receive loyalty program business rules provided by the first sponsor for the first loyalty program;
- store transaction histories of a plurality of consumers including the first consumer;
- receive a request to process a transaction between a first merchant and the first consumer, the request comprising transaction data;
- compare the transaction data with the respective requirements of the plurality of loyalty programs;
- process the transaction data using the loyalty program business rules to compute a first loyalty currency amount and a second loyalty currency amount, the first and second loyalty currency amounts corresponding to different types of loyalty currencies, wherein the first loyalty currency amount is a dollar credit and the second loyalty currency amount is a number of points, and wherein the processing the transaction data further comprises using data for the first consumer from the transaction histories to compute the first and second loyalty currency amounts;
- access a consumer profile of the first consumer to implement the loyalty program business rules; and
- in response to the transaction data meeting the requirements of the first loyalty program, award the first loyalty currency amount to a first loyalty currency balance of the account of the first consumer and the second loyalty currency amount to a second loyalty currency balance of the account.

* * * * *